June 1, 1971 E. C. JERABEK ET AL 3,582,405
METHOD OF GENERATING ELECTRICAL ENERGY
Original Filed Nov. 25, 1968
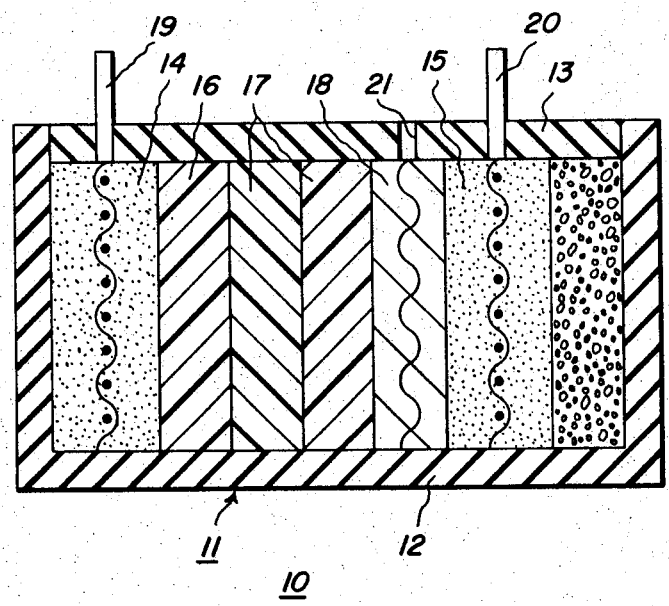
INVENTORS:
ELIHU C. JERABEK,
ROBERT P. HAMLEN
by Paul R. Webb, II
THEIR ATTORNEY United States Patent Office 3,582,405
Patented June 1, 1971

3,582,405
METHOD OF GENERATING ELECTRICAL ENERGY
Elihu C. Jerabek, Voorheesville, and Robert P. Hamlen, Scotia, N.Y., assignors to General Electric Company
Original application Nov. 25, 1968, Ser. No. 778,452, now Patent No. 3,532,555. Divided and this application Jan. 19, 1970, Ser. No. 3,721
Int. Cl. H01m 21/00
U.S. Cl. 136—114                          4 Claims

ABSTRACT OF THE DISCLOSURE

A method of generating electrical energy from a battery is disclosed which battery has a cathode and an anode spaced apart within a casing, an encapsulated aqueous electrolyte within the casing, and a small amount of additional free electrolyte. Upon initial cell discharge, the expansion of the anode ruptures the encapsulated electrolyte furnishing a sufficient supply of aqueous electrolyte for the remainder of the cell discharge. Loss of capacity from self-discharge is eliminated or reduced to a nominal amount since only a small amount of additional free electrolyte is present in the cell until cell discharge.

---

This application is a division of our copending application, Ser. No. 778,452, filed Nov. 25, 1968, now U.S. Pat. No. 3,532,555, which is assigned to the same assignee as the present application.

This invention relates to methods of generating electrical energy from batteries, and to methods of forming batteries and, more particularly, to methods of generating electrical energy from encapsulated electrolyte batteries, and to methods of forming such batteries.

A primary battery has a casing with a cathode and an anode positioned therein and spaced apart, and an aqueous electrolyte in contact with the electrodes. For example, a silver oxide-zinc battery has an electrically insulating casing, a pressed silver oxide cathode positioned in the casing, and a pressed zinc anode positioned in the casing and spaced from the cathode. A chemically inert porous separator is also positioned between the electrodes, and an alkaline electrolyte such as potassium hydroxide or sodium hydroxide is in contact with the electrodes. Such batteries are generally manufactured in a charged state thereby available to produce electrical energy upon discharge.

Presently, serious problems in such batteries which employ an aqueous electrolyte are loss of capacity of the anode on open circuit because of electrode contact with the aqueous electrolyte and resultant shortened shelf-life. Our invention is directed to a method of generating electrical energy from an encapsulated electrolyte battery and to methods of forming such a battery wherein above problems are eliminated or reduced substantially.

It is a primary object of our invention to provide a method of generating electrical energy from an encapsulated electrolyte battery.

It is another object of our invention to provide an improved method of forming such a battery.

In the single figure of the drawing, there is shown generating electrical energy from a battery comprises positioning a cathode within a casing, positioning an anode within the casing and spaced from the cathode, positioning an encapsulated aqueous electrolyte within the casing, providing within the casing an additional amount of aqueous electrolyte sufficient to initiate an initial battery discharge, and applying a load across the electrodes whereby the initial cell discharge causes expansion of the anode rupturing the encapsulated electrolyte and furnishing a sufficient supply of aqueous electrolyte for the remainder of the cell discharge.

These and various other objects, features and advantages of the invention will be better understood from the following description taken in connection with the accompanying drawing in which:

The single figure is a sectional view of a battery made in accordance with our invention.

In the single figure of the drawing, there is shown generally at 10 a battery made in accordance with our invention which has an electrically insulating casing 11 including a body portion 12 and a cover portion 13 sealed thereto. A silver-oxide cathode 14 is shown positioned within body portion 12, while a zinc electrode 15 is also shown within the body portion 12 and spaced from cathode 14. Between cathode 14 and anode 15, there is shown a plurality of chemically inert, porous separators 16, 17 and 18. Separator 16 is shown as a fine porous thermoplastic polymer sheet positioned adjacent the cathode and on whose opposite side is positioned two sheets of cellophane separator 17. A layer 18 of unwoven nylon fabric is positioned between the second cellophane sheet 17 and anode 15. While these particular separators are shown for the silver oxide-zinc cell, a single separator can be employed.

Further, it will be appreciated that with other types of batteries wherein the cathode and anode are spaced apart, such a separator can be employed as spacer material or eliminated. Electrodes 14 and 15 are provided with electrical leads 19 and 20, respectively, which extend through associated openings in cover portion 13 of casing 11. An opening 21 is shown in cover portion 13, which opening can be sealed after the addition of further electrolyte or water to the cell. In the event that no water or additional electrolyte is required, such an opening would not be included in the cover portion 13. Anode 15 is shown spaced from the interior surface of the side wall of body portion 12 of casing 11. Within this space are provided a plurality of capsules 22 of a material such as polyvinyl alcohol each of which contain a desired concentration of an aqueous electrolyte such as sodium hydroxide.

We discovered unexpectedly that a battery could be formed by providing a casing, a cathode positioned in the casing, an anode positioned in the casing and spaced from the cathode, and an encapsulated aqueous electrolyte positioned within the casing. While various types of batteries employing a variety of cathodes and anodes can be formed in this manner, we found that such a battery was particularly suitable for use with a silver-oxide cathode and a zinc anode. Similarly, various types of aqueous electrolytes are employed depending on the particular cathode and anode selected. For example, in our preferred silver oxide-zinc battery, aqueous alkaline electrolytes are employed such as potassium hydroxide and sodium hydroxide. We prefer to use an electrically insulated casing for the battery, but this is not essential since at least one of the electrodes can be electrically insulated from the electrically conductive casing.

Our unique battery employs an encapsulated aqueous electrolyte positioned within the casing. We prefer to place the encapsulated aqueous electrolyte between the anode and the interior surface of the casing wall. In this manner upon initial discharge of the cell the swelling of the anode will rupture the encapsulated electrolyte thereby permitting flow of the electrolyte into contact with both of the electrodes. The positioning of the encapsulated electrolyte near the anode or between the anode and the casing wall is further desirable since it is advantageous to have a higher concentration of the electrolyte near the anode.

Various forms of encapsulated aqueous electrolytes can be utilized in our invention. The aqueous electrolyte may be encapsulated in a single structure or may, as we prefer, be enclosed in a plurality of individual capsules. For example, capsules containing sodium hydroxide can be obtained from the National Cash Register Company, Dayton, Ohio. In capsule form we prefer to place the capsules in a space provided initially between the anode and the casing wall. While we prefer to employ sodium hydroxide as the encapsulated aqueous electrolyte for our silver oxide-zinc battery, other alkaline electrolytes such as potassium hydroxide are suitable. It will, of course, be appreciated that the aqueous electrolyte can be acid or alkaline depending upon the cathode and anode structure selected for the battery. We found that by employing an encapsulated aqueous electrolyte and only a small amount of additional free electrolyte there is no substantial amount of free electrolyte within the casing to promote self-discharge thereby resulting in a serious loss of capacity prior to battery operation.

We found various manners to rupture the encapsulated aqueous electrolyte to provide free electrolyte within the casing. We can add water to the battery prior to its operation whereby the water is absorbed through the permeable encapsulation thereby rupturing the encapsulation structure. Secondly, we found that a small amount of free electrolyte can be added to the battery, preferably to both electrodes, at the time of manufacture. In this manner, the small amount of free aqueous electrolyte is sufficient to provide an initial discharge of the battery whereby the expansion of the anode will rupture the encapsulated structure. We found also that we can add part of the required electrolyte for the battery in an encapsulated structure and part of the electrolyte as free electrolyte.

Of the above methods of rupturing the encapsulated structure, we prefer at the time of assembling the battery to provide a small amount of free electrolyte of the same type as contained in the encapsulated structure in both of the electrodes for subsequent initiation of the initial discharge of the battery. In this manner, the battery can be sealed at the time of its manufacture and no further addition of electrolyte or water is required prior to battery operation.

We found that we can generate electrical energy from a battery of the above type made in accordance with our invention by applying a load across the electrodes, to which were previously added a small amount of electrolyte, thereby rupturing the encapsulated structure through expansion of the anode. The electrolyte from the ruptured encapsulated structure furnishes then a sufficient supply of aqueous electrolyte for the remainder of the cell discharge.

Examples of an encapsulated electrolyte battery, method of forming such a battery, and method of generating electrical energy from such a battery in accordance with our invention are set forth below:

EXAMPLE 1

A battery was assembled generally in accordance with the single figure of the drawing wherein an electrically insulating plastic casing having a body portion and a cover portion were provided. A silver oxide cathode having dimensions of 1 inch by 1 inch and having 8 ampere hours in capacity was positioned in the casing with its lead extending from the top of the casing body portion. A thermoplastic porous separator was positioned against the cathode on the opposite side from the casing wall. A pair of cellophane separators were positioned against the thermoplastic separator. A layer of unwoven Dynel felt was positioned against the cellophone separators. A zinc electrode amalgamated with 5 weight percent mercury and having 8 ampere hours in capacity was positioned against the felt separator. The lead from the zinc anode extended upwardly from the open top of the casing body portion. A space was provided between the zinc electrode and the interior surface of the casing wall. This space was filled with a plurality of capsules containing 30 weight percent aqueous sodium hydroxide. The capsules ranged in size from $\frac{1}{16}$ of an inch to 20 mesh. Two cubic centimeters of 1 N free aqueous sodium hydroxide was added to the silver oxide cathode and two cubic centimeters of .7 N sodium hydroxide was added to the zinc electrode. The cover portion of the casing with a pair of holes through which the electrical leads extended was affixed to the body portion and sealed thereto. A small amount of free electrolyte which was added to the battery did not result in self-discharge with a resultant loss of capacity. Secondly, the amount of water in the free electrolyte was insufficient to cause the capsules to rupture by osmotic pressure.

EXAMPLE 2

The battery as set forth above in Example 1 was operated by initially discharging the battery whereby the expansion of the anode ruptured the capsules providing a sufficient amount of electrolyte in contact with the electrodes for the continuation of the battery discharge. The battery was discharged at a high rate of 60–30 ma./in.$^2$ for most of its delivered capacity. The rest of its capacity was delivered at 10 ma./in.$^2$. The delivered capacity was 6.4 ampere hours out of a total of 8.0 ampere hours for an efficiency of 80%.

While other modifications of the invention and variations thereof which may be employed within the scope of the invention have not been described, the invention is intended to include such as may be embraced within the following claims:

What we claim as new and desire to secure by Letters Patent of the United States is:

1. A method of generating electrical energy from a battery which comprises positioning a cathode within a casing, positioning an anode within the casing and spaced from the cathode, positioning an encapsulated aqueous electrolyte within the casing, providing within the casing an amount of free flowing aqueous electrolyte sufficient to initiate an initial battery discharge and insufficient to promote complete self-discharge, and applying a load across the electrodes causing expansion of the anode and rupturing the encapsulated electrolyte through the expansion of the anode to furnish a sufficient supply of aqueous electrolyte for the remainder of the cell discharge.

2. A method as in claim 1, wherein the encapsulated electrolyte is contained in a plurality of capsules.

3. A method as in claim 2, wherein the capsules are positioned between the anode and the wall of the battery casing.

4. A method as in claim 3, wherein the cathode is a silver oxide electrode, the anode is a zinc electrode, the aqueous electrolyte in the capsules is sodium hydroxide, and the free flowing aqueous electrolyte is sodium hydroxide.

References Cited

UNITED STATES PATENTS

| | | | |
|---|---|---|---|
| 3,260,620 | 7/1966 | Gruber | 136—86 |
| 3,293,080 | 12/1966 | Gruber et al. | 136—86 |
| 3,304,202 | 2/1967 | Sam | 136—6 |
| 3,343,993 | 9/1967 | Andersson | 136—90 |
| 3,454,430 | 7/1969 | Gruber | 136—86 |
| 3,508,694 | 4/1970 | Gruber | 136—86X |

WINSTON A. DOUGLAS, Primary Examiner

A. SKAPARS, Assistant Examiner